US009075405B1

(12) United States Patent
Anvari (10) Patent No.: US 9,075,405 B1
(45) Date of Patent: *Jul. 7, 2015

(54) CONTROL ALGORITHM FOR HELMET WITH WIRELESS SENSOR

(71) Applicant: Kiomars Anvari, Walnut Creek, CA (US)

(72) Inventor: Kiomars Anvari, Walnut Creek, CA (US)

(73) Assignee: Kiomars Anvari, Walnut Creek, CA (US)

( * ) Notice: Subject to any disclaimer, the term of this patent is extended or adjusted under 35 U.S.C. 154(b) by 210 days.

This patent is subject to a terminal disclaimer.

(21) Appl. No.: 13/815,154

(22) Filed: Feb. 5, 2013

Related U.S. Application Data

(63) Continuation of application No. 13/694,969, filed on Jan. 10, 2013, now Pat. No. 8,947,195.

(51) Int. Cl.
*G05B 13/00* (2006.01)
*G05B 13/02* (2006.01)

(52) U.S. Cl.
CPC .................................. *G05B 13/021* (2013.01)

(58) Field of Classification Search
USPC ........... 2/425, 410–421; 702/41, 43; 700/285, 700/28; 701/301; 340/686.6
See application file for complete search history.

(56) References Cited

U.S. PATENT DOCUMENTS

| 5,287,562 | A  | * | 2/1994  | Rush, III ........................... 2/413 |
| 5,390,367 | A  | * | 2/1995  | Rush, III ........................... 2/462 |
| 5,621,922 | A  | * | 4/1997  | Rush, III ........................... 2/422 |
| 7,150,048 | B2 | * | 12/2006 | Buckman .......................... 2/465 |
| 7,693,668 | B2 | * | 4/2010  | Vock et al. ...................... 702/44 |
| 8,127,373 | B1 | * | 3/2012  | Fodemski ........................ 2/413 |
| 8,702,516 | B2 | * | 4/2014  | Bentley et al. ................. 463/39 |
| 8,947,195 | B1 | * | 2/2015  | Anvari ........................ 340/3.1 |
| 2005/0177929 | A1 | * | 8/2005 | Greenwald et al. ............... 2/425 |
| 2009/0023422 | A1 | * | 1/2009 | MacInnis et al. ............. 455/411 |
| 2010/0225522 | A1 | * | 9/2010 | DeMersseman ................ 342/72 |
| 2012/0102630 | A1 | * | 5/2012 | Anderson ........................ 2/413 |
| 2013/0110415 | A1 | * | 5/2013 | Davis et al. ..................... 702/41 |
| 2014/0000011 | A1 | * | 1/2014 | Johnson ........................... 2/413 |
| 2014/0109304 | A1 | * | 4/2014 | Kwan et al. ..................... 2/461 |
| 2014/0149067 | A1 | * | 5/2014 | Merril et al. ................. 702/141 |
| 2014/0266752 | A1 | * | 9/2014 | John ............................. 340/665 |

* cited by examiner

*Primary Examiner* — Joshua Kennedy (57) ABSTRACT

A control algorithm for helmet with wireless sensor system for monitoring of surrounding objects. The control algorithm comprises of an outer antenna loop to use one of the antennas for transmission, an inner transmission and reception loop to transmit from one antenna and receive from one or more antennas to measure speed, distance and direction of an approaching object to determine when and where an impact will occur, and a number of stiffenable and destiffenable pads installed on the helmet and external to the helmet that will be activated prior to an impact.

8 Claims, 7 Drawing Sheets

CONTROL ALGORITHM FOR HELMET WITH WIRELESS SENSOR

This application is a continuation of application Ser. No. 13/694,969, now U.S. Pat. No. 8,947,195, filed Jan. 10, 2013, the entirety of which is expressly incorporated by reference herein

BACKGROUND

Over the last few years, safety concerns regarding football helmets and concussions have become a most pressing issue. Safety issues in football are now ubiquitous, ranging from increased safety measures in the NFL to academics rating the best football helmets. And now legislation is spreading across America aimed at treating student-athletes with concussions.

Football helmet manufacturers are very aware of this, which is why they have created the most innovative and advanced helmets the sport has ever seen. Helmets have radically transformed over the last 10 years into engineering marvels.

The drive to minimize head injuries in sports is stronger than ever, especially in football. The NFL, recognizing the importance, has put stricter player-safety rules and policies in place—but technology is catching up to offer preventive methods to combat the issue.

One way of minimizing head injuries and concussion is to predict the impact using wireless sensors. Wireless sensors estimates and calculate the distance, speed and direction of an external object before an impact happens. Therefore, before an impact happens certain pads can be activated to absorb portion of the force of impact and minimize the force applied to scalp. The pads also can reduce the head movement to avoid possible spine injury.

BRIEF DESCRIPTION OF THE DRAWINGS

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
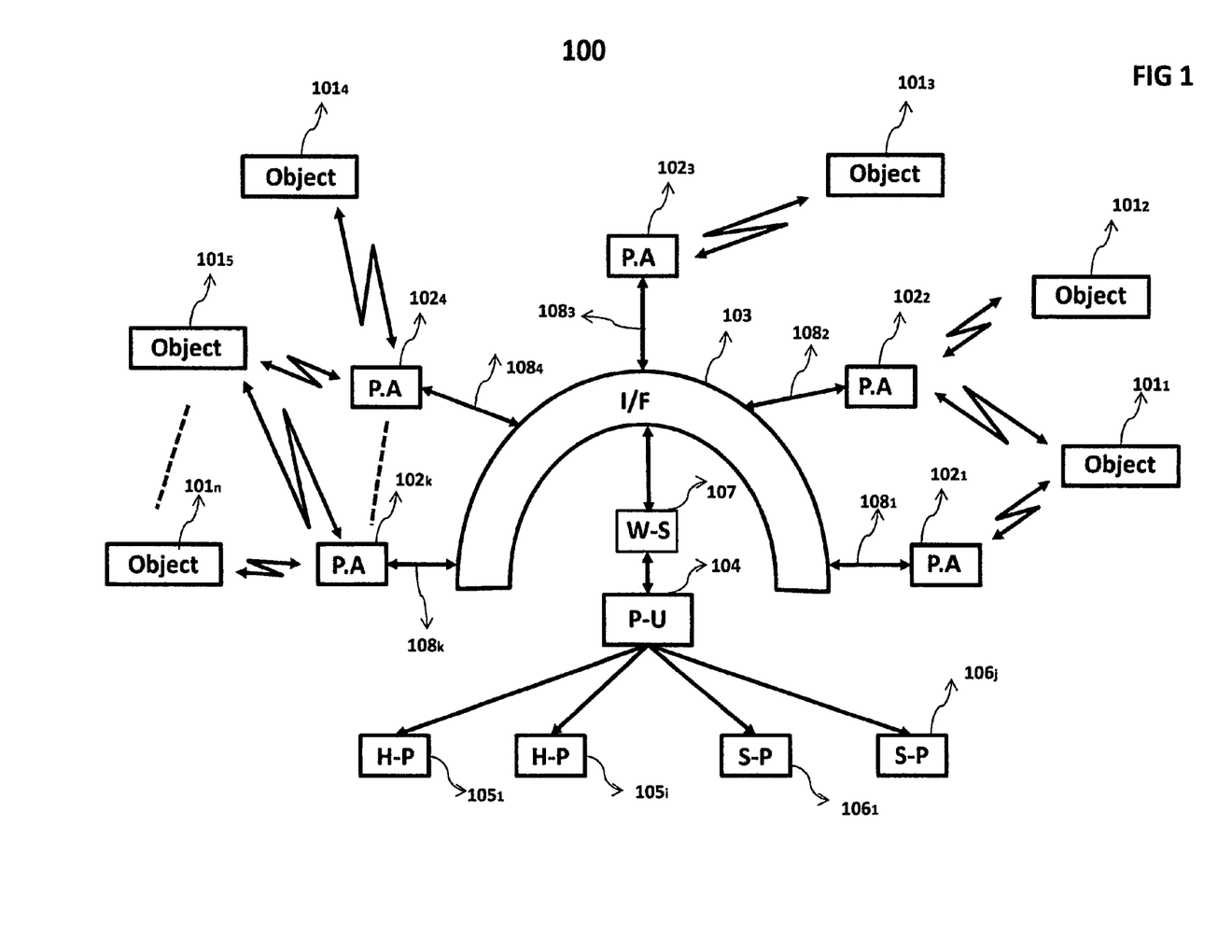
FIG. 1 illustrates an embodiment of a wireless sensing system with patch antenna.

FIG. 1 depicts an embodiment of wireless sensing system 100. In general, wireless sensing system 100 facilitates in the providing of information, to a processing unit (P-U) 104, from wireless sensor (W-S) 107 through an antenna interface (I/F) 103 and patch antenna $102_1$-$102_k$. For example, processing unit 104 requests information from the wireless sensors 107. In response to the request, wireless sensor 107 through antenna interface 103, transmission lines $108_1$-$108_k$ and patch antennas $102_1$-$102_k$ provides the requested information to the processing unit 104. In various embodiments, the wireless sensors 107 provides raw information such as but not limited to, distance of objects $101_1$-$101_n$ from wireless sensors patch antenna $102_1$-$102_k$, speed of objects $101_1$-$101_n$ towards patch antenna $102_1$-$102_k$. It should be appreciated that wireless system 100 is time division multiplexed.

Wireless sensor system 100 includes, among other things, processing unit 104, antenna interface 103, wireless sensors 107, transmission line $108_1$-$108_k$, patch antenna $102_1$-$102_k$, helmet pads (H-P) $105_1$-$105_i$, shoulder pads (S-P) $106_1$-$106_j$, and objects $101_1$-$101_n$.

In one embodiment, processing unit 104, antenna interface 103, wireless sensors 107, transmission lines $108_1$-$108_k$ and patch antenna $102_1$-$102_k$ are components of wireless system 100 that could reside in the helmet and these components provides activation signal to the helmet pads $105_1$-$105_i$ as well as shoulder pads $106_1$-$106_j$. For example, helmet pad $105_2$, through wireless system 100, is activated to provide protection. In various embodiments, the pads can be helmet pads that are attached to helmet or pads that are attached to shoulder pad.

Processing unit 104 is for processing information received from wireless sensors 107 through antenna interface 103, transmission lines $108_1$-$108_k$ and patch antennas $102_1$-$102_k$. Processing unit 104 typically utilizes appropriate hardware and software algorithm to properly process the information.

Wireless sensor can be any wireless transceiver that is able to wirelessly transmit communication signals, such as short coded pulses. Wireless sensor is disposed on any physical platform that is conducive to effectively transmit the signals. For example, is disposed on inner shell of a helmet.

In various embodiments, all communication to and from the wireless sensor 107 passes through the antenna interface 103. For example, the antenna interface 103 through processing unit 104 is configured to communicate through transmission lines $108_1$-$108_k$ to one of the patch antenna $102_1$-$102_k$ only for a specified period of time. For example, processing unit 104 requests information from the wireless sensor 107 by configuring antenna interface 103 to communicate through transmission line $108_1$ with patch antenna $102_1$. The request is received by the wireless sensor 107 is in form or an activation signal for a specified period of time. Upon receipt of activation signal, the wireless sensor 107 transmits signals through antenna interface 103, transmission lines $108_1$-$108_k$ and patch antennas $102_1$-$102_k$ to surrounding objects $101_1$-$101_n$. A portion of transmitted signal reflects from objects $101_1$-$101_n$. The reflected signals from objects $101_1$-$101_n$ are received by wireless sensor 107 through patch antenna $102_1$-$102_k$ and antenna interface 103 and then sent to processing unit 104. In particular the processing unit 104 receives the information (in the form of reflected signal from objects $101_1$-$101_n$) via wireless sensor 107.

In one embodiments, the processing unit 104 requests information from the wireless sensor 107 by configuring antenna interface 103 to communicate through one of transmission line $108_1$-$108_k$ with one of patch antenna $102_1$-$102_k$. The request is received by the wireless sensor 107 is in form or an activation signal for a specified period of time. Upon receipt of activation signal, the wireless sensor 107 for example transmits signals through antenna interface 103, transmission lines $108_1$ and patch antennas $102_1$ to surrounding objects $101_1$-$101_n$. A portion of transmitted signal reflects from objects $101_1$-$101_n$. The reflected signals from objects $101_1$-$101_n$ are received by wireless sensor 107 through two or more of the patch antenna $102_1$-$102_k$, for example patch antennas $102_1$, $102_3$, and $102_5$ and antenna interface 103 and then sent to processing unit 104. In particular the processing unit 104 receives the information (in the form of reflected signal from objects $101_1$-$101_n$) via wireless sensor 107.

In one embodiment, communications through wireless network 100 are selected by antenna interface 103. In general antenna interface 103 at any specified period of time connects processing unit 104 and wireless sensor 107 to one or more of patch antenna $102_1$-$102_k$. It is commonly used as transmitter or receiver between processing unit 104 and patch antenna $102_1$-$102_k$.

In one embodiment, communications through wireless network 100 are transmitted by one of patch antenna $102_1$-$102_k$. In general at any specified period of time one of the patch antennas $102_1$-$102_k$ is selected by antenna interface 103 for transmission and one or more patch antenna $102_1$-$102_k$ are selected for reception. Each one of patch antennas $102_1$-$102_k$ can comprise of one transmit and one receive antenna. Transmit and receive patch antennas are physically separated to provide sufficient isolation between transmit and receive patch antennas.

In one embodiment, communications through wireless network 100 are transmitted by one of patch antenna $102_1$-$102_k$. In general at any specified period of time one of the patch antennas $102_1$-$102_k$ is selected by antenna interface 103 for transmission or reception. Each one of patch antennas $102_1$-$102_k$ can comprise of one antenna only. Transmit and receive selection is performed by wireless transceiver 107.

Processing unit 104 has a variety of functions. In general, processing unit 104 is utilized for signal processing, calculation, estimation, activities, methods, procedures, and tools that pertain to the operation, administration, maintenance, and provisioning of wireless sensor network. In one embodiment, processing unit 104 includes a database that is used for various applications. The database can be utilized for analyzing statistics in real-time. Such statistics can be related to number of impacts, severity of impacts, number of helmet pads and shoulder pads, and any other available statistics.

Processing unit 104 also has a variety of thresholds, such as, but not limited to, distance of object before helmet pads activation, distance of object before shoulder pads activation, wireless sensor activation time, distance before any impact, pulse signal width, etc. In general, processing unit 104 provides controls to various components that are connected to it. Moreover, processing unit 104 is a high capacity communication facility that connects primary nodes.

In one embodiment, received information from wireless sensor 107 is used in processing unit 104. As such, processing unit 104 will utilize the received information to calculate the distance, speed and direction of objects $101_1$-$101_n$. The processing unit 104 then uses the calculated information and various thresholds stored in its data base to activate one of the helmet pads $105_1$-$105_i$ and/or one of the shoulder pads $106_1$-$106_j$ before an impact occurs.

In one embodiment the processing unit 104 activates one or more of helmet pads $105_1$-$105_i$ and shoulder pads $106_1$-$106_j$. Both helmet pads $105_1$-$105_i$ and shoulder pads $106_1$-$106_j$ are stiffenable/de-stiffenable pads, pillows and elastic bands to prevent rotational acceleration, by stiffening the movement of the head through stabilization technique just before impact. Both helmet pads $105_1$-$105_i$ and shoulder pads $106_1$-$106_j$ will also act as a shock absorber when at impact, making them reducing the impact as well as rotational acceleration.

In one embodiment the wireless sensor 107 is a transceiver that periodically switches between transmission and reception. During transmission a signal is transmitted and during the reception period the reflected signals from the objects $101_1$-$101_n$ are received. The received signal by patch antennas $102_1$-$102_k$, transmission lines $108_1$-$108_k$, is then sent to processing unit 104 through, wireless sensor 107, and antenna interface 103 for further processing.

In one embodiment the wireless sensor 107 is microwave, or millimetric wave transceiver. The wireless sensor 107 could be connected to the antenna interface 103 via a transmission line.

In one embodiment wireless sensor 107 is controlled by processing unit 104. The processing unit 104 controls transmit pulse width and number of times a pulse is transmitted by wireless sensor 107. Processing unit 104 also coordinates the transmit time and receive time period for the wireless sensor 107.

In one embodiment wireless sensor 107 is connected to patch antenna $102_1$-$102_k$ through antenna interface 103 and transmission lines $108_1$-$108_k$. The transmission lines $108_1$-$108_k$ are coaxial, micro strip, or strip lines.

Figure 2:
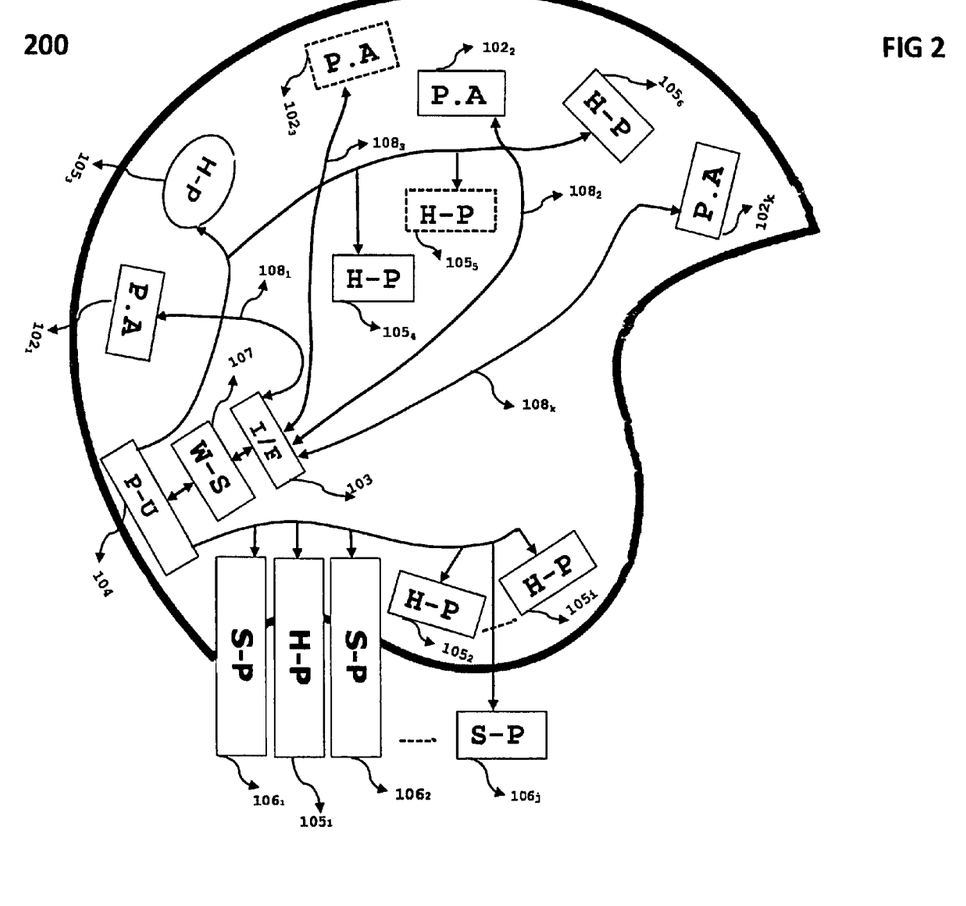
FIG. 2 illustrates embodiments of a method for minimizing and protecting the head movement using a wireless sensing system.

FIG. 2 depicts an embodiment of wireless sensor system on a helmet 200. In one embodiment, helmet 200 comprises of an intelligent wireless sensing system 100 as shown in FIG. 1. In general, helmet 200 is configured for facilitating in the monitoring/detection of possible collision by any object. In particular, helmet 200 is able to process a high volume of data and control various pads to minimize the effect of collision impact. In one embodiment helmet 200 is capable of providing protection that requires for all sort of collision impacts.

In one embodiment, helmet 200 is implemented in-line with wireless sensor system 100. In another embodiment, pluralities of patch antennas are disposed at various locations in wireless sensor system 100 for facilitating in the monitoring/detection of a possible impact.

Helmet 200 includes processing unit 104, antenna interface 103, wireless sensors 107, transmission lines $108_1$-$108_k$, patch antenna $102_1$-$102_k$, helmet pads $105_1$-$105_i$, and interface to shoulder pads $106_1$-$106_j$.

The processing unit 104 on helmet 200 communicates with shoulder pads $106_1$-$106_j$. A physical connection between processing unit 104 and shoulder pads $106_1$-$106_j$ will facilitate this communication.

In one embodiment the patch antenna $102_1$-$102_k$ are installed at location on helmet to provide most effective information for processing unit 104. Processing unit 104 will use this information to estimate location, speed and direction of objects with high accuracy.

In one embodiment the helmet pads $105_1$-$105_i$ are installed at locations on helmet to provide the most effective protection from an impact. Processing unit 104 will activate one or more of the helmet pads 105₁-105ᵢ prior to impact once a potential impact is detected.

In one embodiment the shoulder pads 106₁-106j are installed at locations on shoulder pad to provide the most effective protection from an impact. Processing unit 104 will activate one or more of the shoulder pads 106₁-106ⱼ prior to impact once a potential impact is detected.

In one embodiment the processing unit 104 will also incorporate the power supply to power all the wireless sensor 107, antenna interface 103, helmet pads 105₁-105ᵢ and possibly shoulder pads 106₁-106ⱼ.

Processing unit 104 is configured to receive the pertinent information and to determine whether the helmet is going to experience a possible impact from an external object based at least in part on the pertinent information provided by the wireless sensor 107. For example, processing unit 104 executes an algorithm (e.g., impact determination algorithm) that utilizes the pertinent information to determine whether or not an external object 101₁-101ₙ is approaching the helmet 200. In various embodiments, processing unit 104 is a multicore CPU, DSP, or FPGA.

Figure 3:
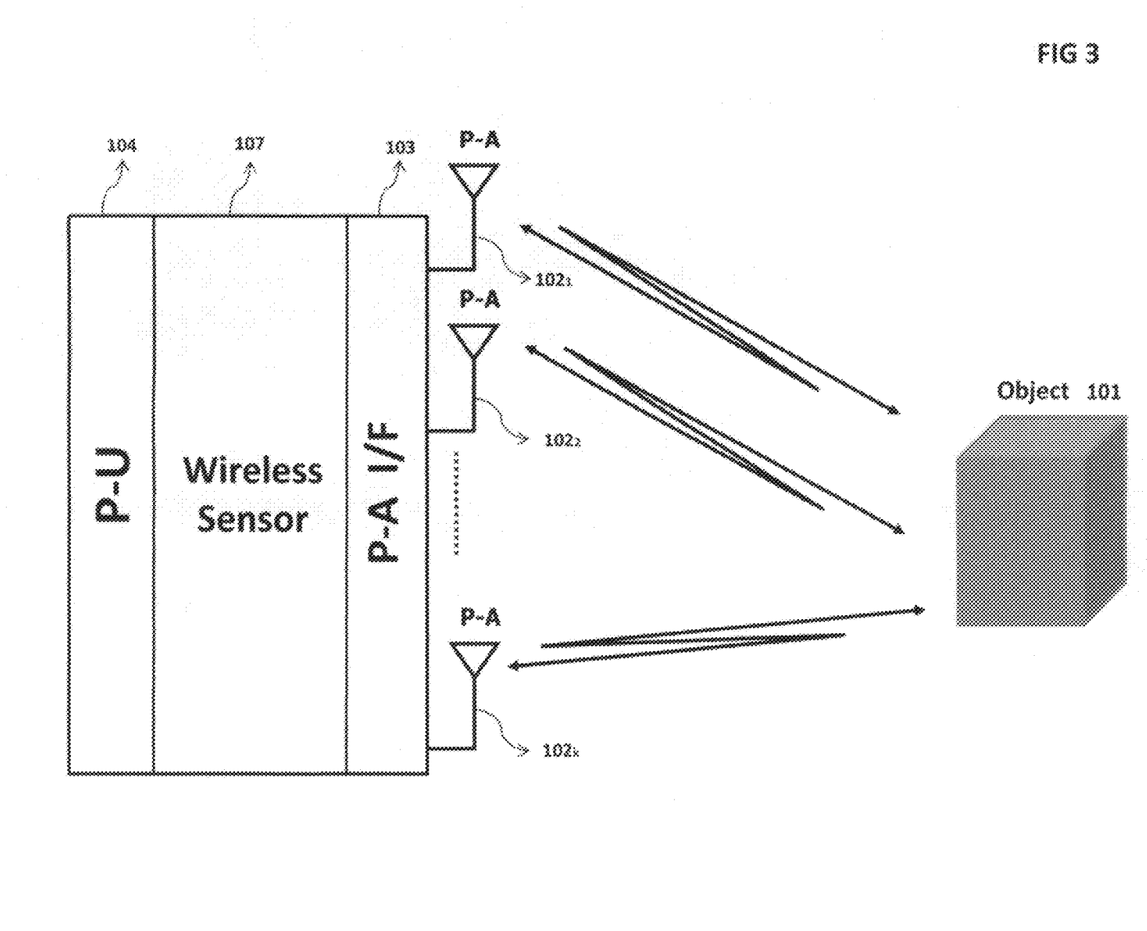
FIG. 3 shows an embodiment of wireless sensor interaction with one object.

FIG. 3 depicts an embodiment of wireless sensor interaction with one object. For instance, wireless sensor system includes processing unit 104, antenna interface 103, wireless sensors 107, and patch antennas 102₁-102ₖ.

Processing unit 104 request information from wireless sensor 107 by sending an activation signal. The sensor receives the activation signal and configure antennal interface 103 for transmission and reception from one of the patch antennas 102₁-102ₖ.

In one embodiment, wireless sensor transmits a known signal towards object 101₁ and receives the reflected signal from object 101₁. Any of the patch antennas 102₁-102ₖ can be used for transmission and reception.

Figure 4:
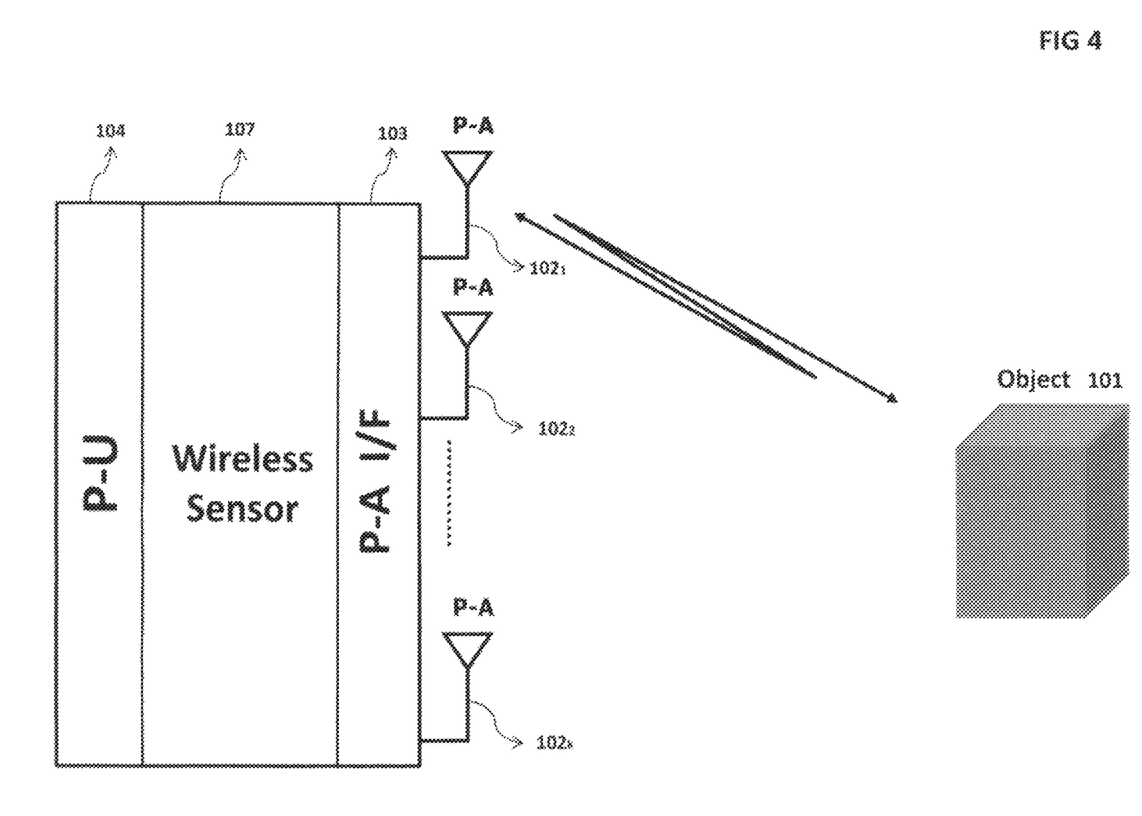
FIG. 4 shows an embodiment of wireless sensor transmitting and receiving from one antenna.

FIG. 4 shows an embodiment of wireless sensor system transmitting and receiving from one antenna. Wireless sensor system includes processing unit 104, antenna interface 103, sensor 107, and patch antennas 102₁-102ₖ.

Processing unit 104 request information from sensor 107 by sending an activation signal. The sensor receives the activation signal and configure antennal interface 103 for transmission reception from one of the patch antennas 102₁-102ₖ, for example patch antenna 102₁. The sensor transmits a known signal from patch antenna 102₁ towards object 101₁ and receives the reflected signal from object 101₁. The received information is then sent to processing unit 104.

Figure 5:
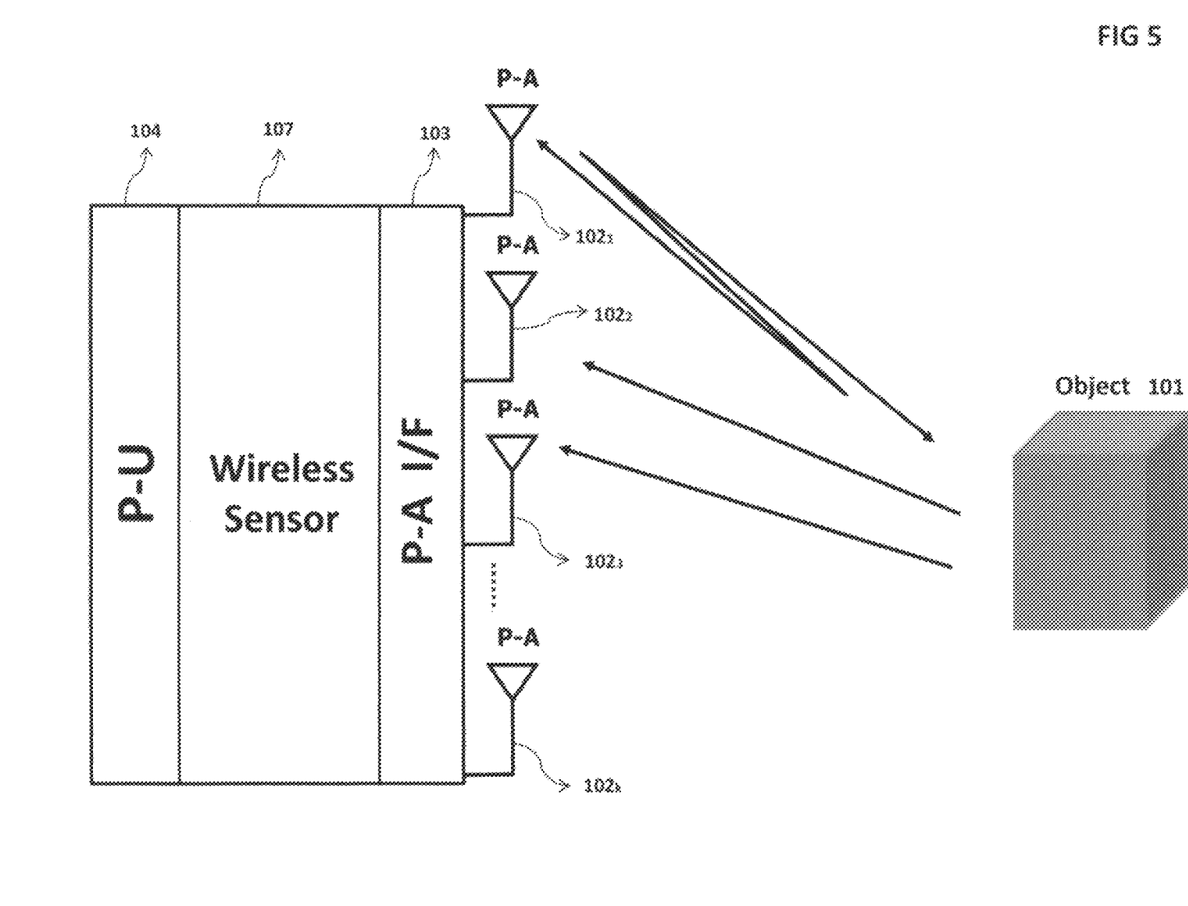
FIG. 5 shows an embodiment of wireless sensor transmitting from one antenna and receiving from more than one antennas.

FIG. 5 shows an embodiment of wireless sensor system transmitting from one patch antenna and receiving from more than one antenna. Wireless sensor system includes processing unit 104, antenna interface 103, sensor 107, and patch antennas 102₁-102ₖ. The wireless sensor for example transmits from patch antenna 102₁ and receives by independent receivers from patch antennas 102₁, 102₂, and 102₃.

Processing unit 104 request information from sensor 107 by sending an activation signal. The sensor receives the activation signal and configure antennal interface 103 for transmission reception from one of the patch antennas 102₁-102ₖ, for example patch antenna 102₁. The sensor transmits a known signal from patch antenna 102₁ towards object 101₁ and receives the reflected signal from object 101₁ from patch antennas 102₁, 102₂, and 102₃. The received information is then sent to processing unit 104.

In one embodiment the wireless sensor transceiver has one transmitter and multiple receivers. The receivers can be assigned to any of the patch antennas 102₁-102ₖ.

Figure 6:
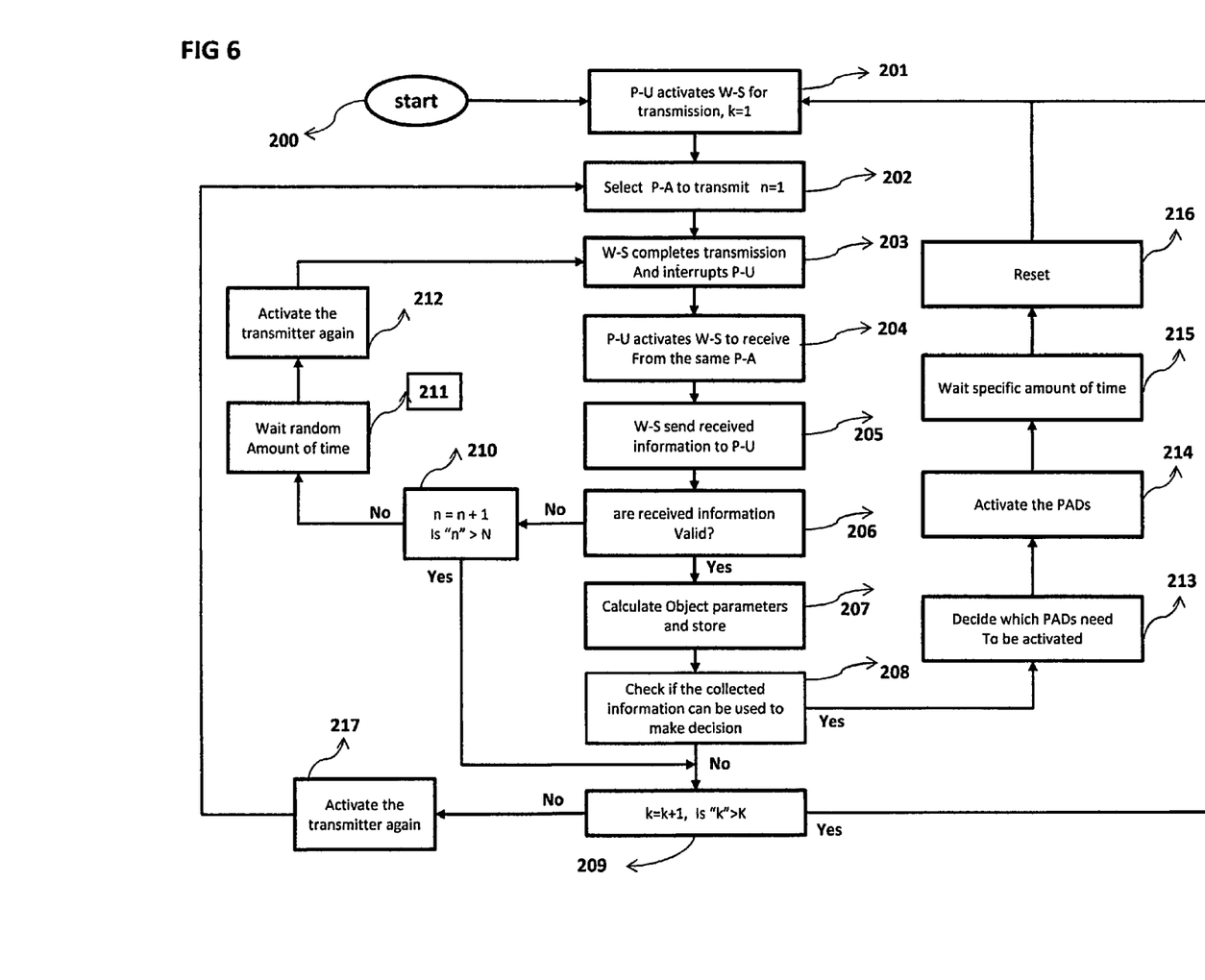
FIG. 6 shows an embodiment of wireless sensor control algorithm when one antenna is used for transmission and reception.

FIG. 6 shows an embodiment of wireless sensor control algorithm when one antenna is used for transmission and reception.

The algorithm start at 200 is when the wireless sensor system is activated, powered on or resets.

At 201 the processing unit (P-U) activates wireless sensor (W-S) for transmission and assigns patch antenna counter k=1.

At 202 a patch antenna (P-A) number "k" is selected. A counter is set n=1.

At 203 the wireless sensor (W-S) completes transmission of known signal and then interrupts processing unit (P-U) to indicate the time transmission completed.

At 204 the processing unit (P-U) activates wireless sensor (W-S) to start receiving from the same patch antenna (P-A) that was used for transmission. If transmitter and receiver have the same antenna then wireless sensor (W-S) through the antenna interface (I/F) has to configure the patch antenna for reception.

At 205 the wireless sensor (W-S) send the received information to processing unit (P-U).

At 206 processing unit (P-U) checks if the received information is valid. If it is valid then processing unit (P-U) proceeds to 207 and if it is not valid it performs function 210.

At 210 processing unit (P-U) increments the counter by one (n=n+1) and checks if "n" is greater than "N" which is the maximum number of times the selected antenna repeats transmission. If "n" is greater than "N" then the function 209 will be performed. If "n" is less than or equal to "N" then it proceeds to 211.

At 211 the process stops for a random amount of time. When the wait time finished it proceeds to 212.

At 212 the processing unit (P-U) activates wireless sensor (W-S) for transmission. Then the steps 203 to 206 are repeated.

At 207 the processing unit (P-U) uses the valid received information to estimate and calculate the parameters such as distance, speed and direction related to external objects.

At 208 processing unit (P-U) processes the estimated, calculated, and configured information to determine if a decision can be make. If a decision can be make then process 213 will be performed. If a decision cannot be made then processing unit (P-U) proceeds to 209.

At 209 the patch antenna (P-A) number is incremented and checked if it is bigger than maximum number of patch antennas "K". If "k" is bigger than "K" then processing unit (P-U) continues the process from 201. If "k" is not bigger than "K" then function 217 is performed.

At 217 processing unit (P-U) activates the transmitter and proceeds to repeat function 202 to 209.

At 213 processing unit (P-U) decides which helmet pad (H-P) and shoulder pad (S-P) should be activated and then proceed to 214.

At 214 the selected pad is activated and proceeds to 215.

At 215 processing unit (P-U) stop processing for a defined amount of time. When the wait time finished then processing unit (P-U) proceeds to 216.

At 216 processing unit (P-U) resets the wireless sensor system and process starts from 201.

Figure 7:
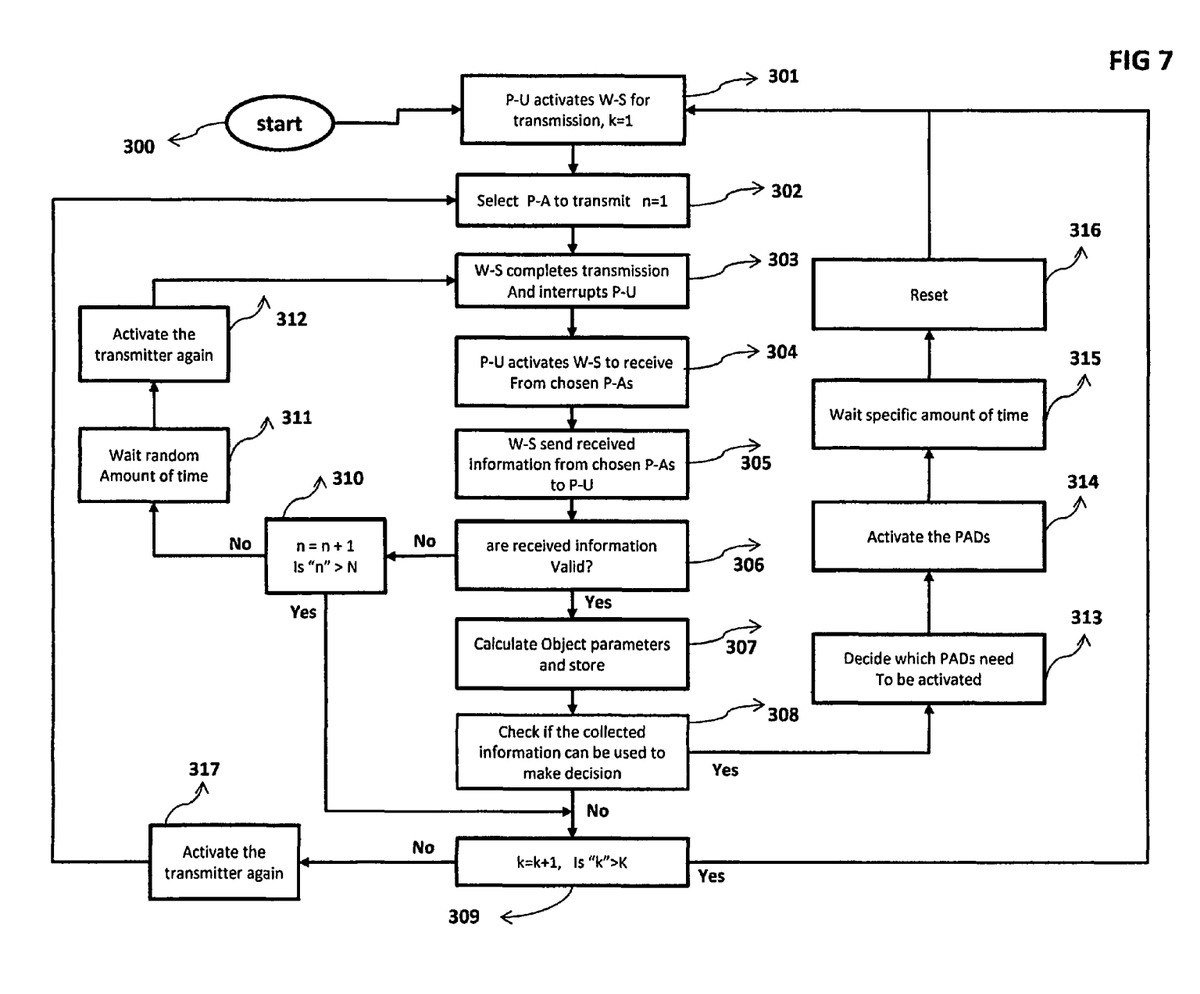
FIG. 7 shows an embodiment of wireless sensor control algorithm when one antenna is used for transmission and more than one antennas are used for reception.

FIG. 7 shows an embodiment of wireless sensor control algorithm when one antenna is used for transmission and more than one antenna is used for reception.

The algorithm start 300 is when the wireless sensor system is activated, powered on or resets.

At 301 the processing unit (P-U) activates wireless sensor (W-S) for transmission and assign patch antenna counter k=1.

At 302 a patch antenna (P-A) number "k" is selected. A counter is set n=1.

At 303 the wireless sensor (W-S) completes transmission of known signal and then interrupts processing unit (P-U) to indicate the time transmission completed.

At 304 the processing unit (P-U) activates wireless sensor (W-S) to start receiving from a number of chosen patch antennas (P-A) including the one used for transmission. If transmitter and receiver have the same antenna then wireless sensor (W-S) through the antenna interface (I/F) has to configure the selected patch antennas (P-A) for reception.

At 305 the wireless sensor (W-S) send the received information to processing unit (P-U).

At 306 processing unit (P-U) checks if the received information is valid. If it is valid then processing unit (P-U) proceeds to 307 and if it is not valid it performs function 310.

At 310 processing unit (P-U) increments the counter by one (n=n+1) and checks if "n" is greater than "N" which is the maximum number of times the selected antenna repeats transmission. If "n" is greater than "N" then the function 309 will be performed. If "n" is less than or equal to "N" then it proceeds to 311.

At 311 the process stops for a random amount of time. When the wait time finished it proceeds to 312.

At 312 the processing unit (P-U) activates wireless sensor (W-S) for transmission. Then the steps 303 to 306 are repeated.

At 307 the processing unit (P-U) uses the valid received information to estimate and calculate the parameters such as distance, speed and direction related to external objects.

At 308 processing unit (P-U) processes the estimated, calculated, and configured information to determine if a decision can be make. If a decision can be make then process 313 will be performed. If a decision cannot be made then processing unit (P-U) proceeds to 309.

At 309 the patch antenna (P-A) number is incremented and checked if it is bigger than maximum number of patch antennas "K". If "k" is bigger than "K" then processing unit (P-U) continues the process from 301. If "k" is not bigger than "K" then function 317 is performed.

At 317 processing unit (P-U) activates the transmitter and proceeds to repeat function 302 to 309.

At 313 processing unit (P-U) decides which helmet pad (H-P) and shoulder pad (S-P) should be activated and then proceed to 314.

At 314 the selected pad is activated and proceeds to 315.

At 315 processing unit (P-U) stop processing for a defined amount of time. When the wait time finished then processing unit (P-U) proceeds to 316.

At 316 processing unit (P-U) resets the wireless sensor system and process starts from 301.

Various embodiments are thus described. While particular embodiments have been described, it should be appreciated that the embodiments should not be construed as limited by such description, but rather construed according to the following claims.

The invention claimed is:

1. A helmet comprising:
   at least one pad that is stiffenable and destiffenable;
   a wireless sensor system comprising:
      a pool of distributed antennas for transmission and reception;
      a pool of transmitters and receivers to transmit a signal and receive reflected signals;
      a computing device with memory to execute a control algorithm;
      the control algorithm comprising:
         an executable main program with a random wait or idle time that executes the control algorithm using a number of functions or subroutines to identify objects in surrounding environment of the helmet, and uses received reflected signals from surrounding objects to retrieve the information data for validation and calculation/estimation of direction, distance and the speed of any surrounding objects approaching the helmet to determine if any pad of the at least one pad, internal or external to the helmet, needs to be activated.

2. The helmet comprising a wireless sensor system of claim 1, wherein a transmit and receive function or subroutine uses an antenna pair from a pool of antenna pairs of said pool of distributed antennas to transmit a defined signal and receive the reflected signals from various objects in a surrounding environment.

3. The helmet comprising a wireless sensor system of claim 1, wherein, a transmit and receive function or subroutine uses a single transmit antenna from said pool of distributed antennas to transmit a defined signal and two or more receivers with associated receive antennas in the wireless sensor system to receive the reflected signals from various objects in the helmet's surrounding environment.

4. The helmet comprising a wireless sensor system of claim 1, wherein a function or subroutine evaluates the reflected signals, determines their validity and stores the valid signal information in the memory.

5. The helmet comprising a wireless sensor system of claim 4, wherein a function or subroutine uses the stored valid received signals information to estimate the direction, distance, and approaching speed of various objects in helmet's surrounding environment.

6. The helmet comprising a wireless sensor system of claim 1, wherein a function or subroutine uses a random generator to calculate both active time and idle time for said executable main program to minimize probability of any collisions of helmet's reflected signals from surrounding objects with signals received from other helmets or devices.

7. The helmet comprising a wireless sensor system of claim 1, wherein a function or subroutine utilizes the estimated direction, distance, and speed of various objects in helmet's surrounding environment and the stored pre-defined data to decide to activate certain of the at least one stiffenable and destiffenable pads.

8. The helmet comprising a wireless sensor system of claim 1, wherein the computing device with memory is an application specific signal processor (ASSP), a multi-core CPU, a digital signal processor (DSP), or a field programmable gate array (FPGA).

* * * * *